Figure 1:
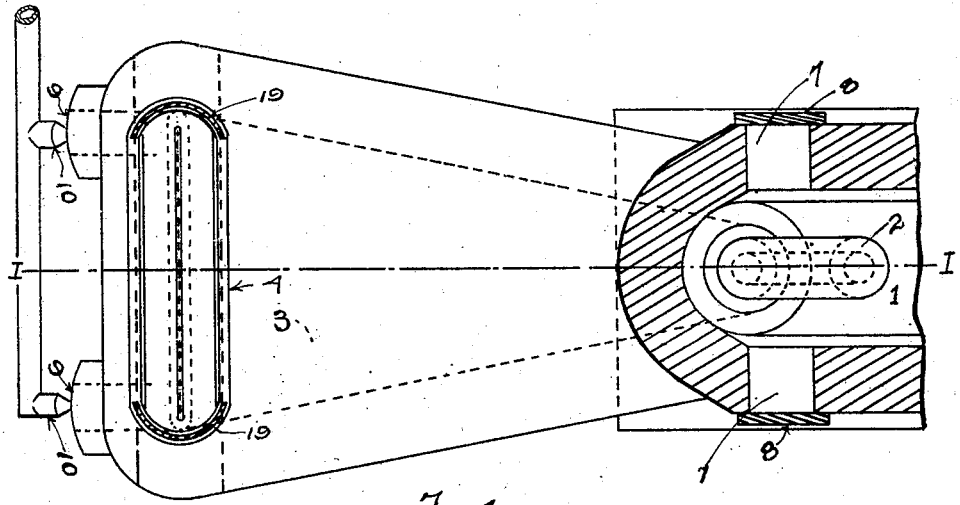

H. K. HITCHCOCK.
METHOD OF AND APPARATUS FOR MAKING GLASS SHEETS.
APPLICATION FILED SEPT. 26, 1905.

918,323.

Patented Apr. 13, 1909.
2 SHEETS—SHEET 1.

WITNESSES:

INVENTOR
Halbert K. Hitchcock

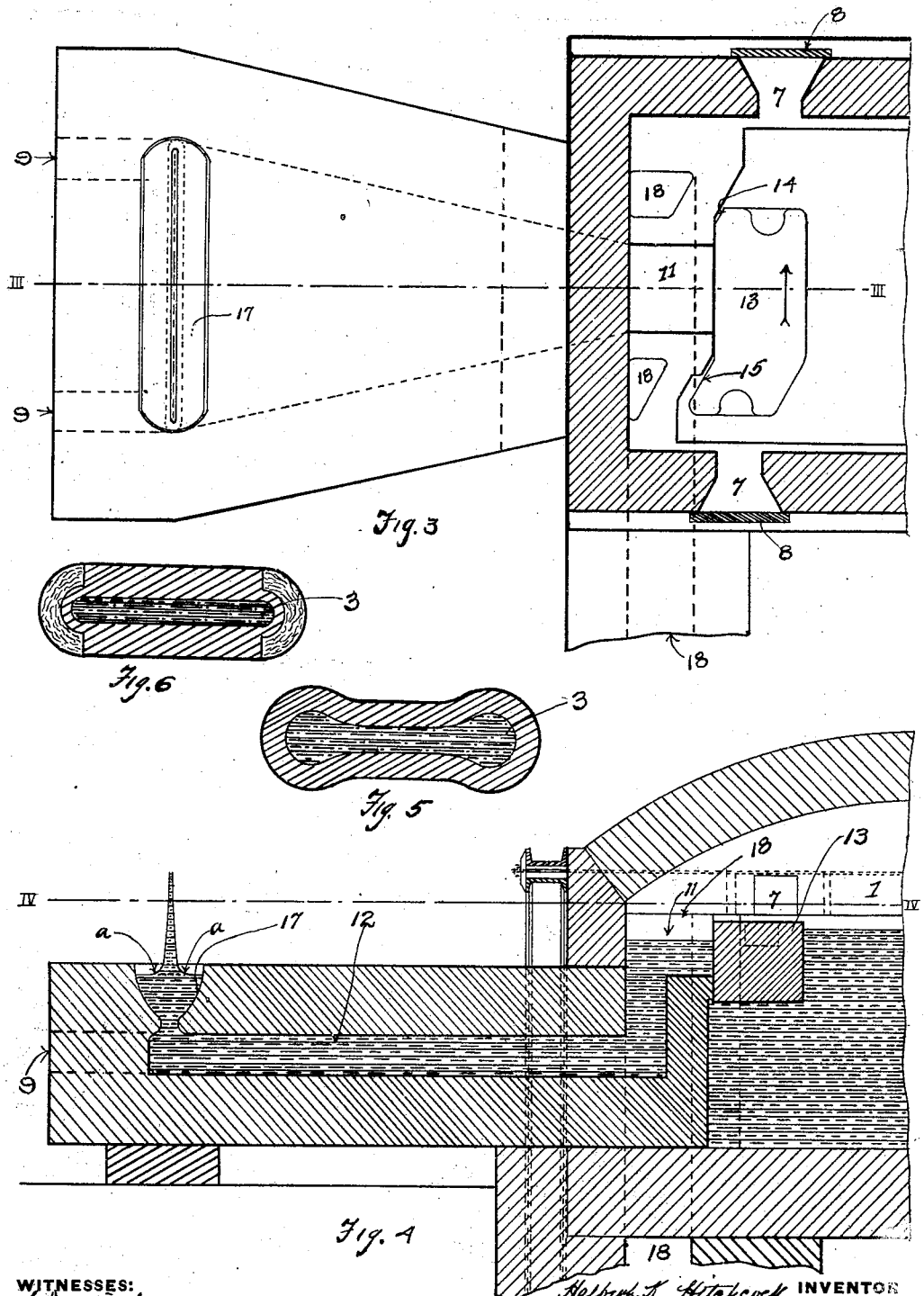

UNITED STATES PATENT OFFICE.

HALBERT K. HITCHCOCK, OF TARENTUM, PENNSYLVANIA, ASSIGNOR TO HIMSELF, AND CHARLES W. BROWN, TRUSTEES, OF PITTSBURG, PENNSYLVANIA.

METHOD OF AND APPARATUS FOR MAKING GLASS SHEETS.

No. 918,323.  Specification of Letters Patent.  Patented April 13, 1909.

Application filed September 26, 1905. Serial No. 280,183.

*To all whom it may concern:*

Be it known that I, HALBERT K. HITCHCOCK, a citizen of the United States, residing at Tarentum, in the county of Allegheny and State of Pennsylvania, have invented a new and useful Improvement in the Method of and Apparatus for Making Glass Sheets, of which the following is a specification.

In the manufacture of sheet glass by drawing operations heretofore it has been customary to control the temperature of the plastic glass prior to the drawing operation by surrounding it on one or more sides with suitable heat generators, to perform the drawing in a closed chamber having also a controlled temperature and to use adjacent to the generating zone artificial refrigerators likewise manually controlled. Thus have been introduced three variables all dependent upon the skill of the operator and subject to change without notice due to variations in the source of heat meteorological conditions, etc. This uncertainty of conditions actually existing has rendered the duplication of results already obtained exceedingly difficult.

The object of the present invention is to so construct and proportion the various parts of the apparatus that their natural heat dissipation shall cool the glass equally throughout its entire transverse section and just sufficiently to render it operative. Furthermore to so adjust the various elements that they shall be automatic in their action so that when one condition changes its action upon the other conditions shall be such as to reëstablish a combination of operative conditions that will give results all of which shall be commercially available.

Figure 2:
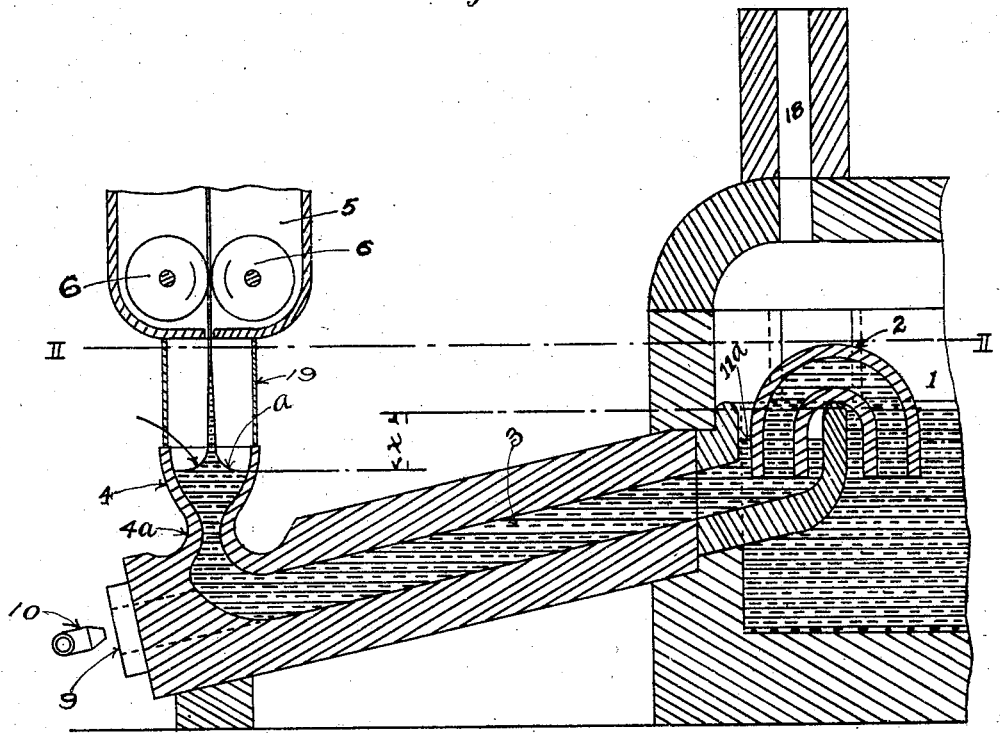

In the drawings forming a part of this specification Figure 1 is a section of my apparatus on a line II., II., Fig. 2. Fig. 2 is a section on the line I., I., Fig. 1. Fig. 3 is a section on the line IV., IV., Fig. 4. Fig. 4 is a section on the line III., III., Fig. 3 of another form of apparatus for the same purpose. Figs. 5 and 6 are sectional detail views illustrating modifications in the construction and shape of the conduit between the glass receptacle and the drawing basin.

Parts 1, 1, are any suitable receptacles for holding and keeping glass in a molten condition preferably an extension to a continuous melting tank furnace from which the radiant heat and gas pass, the gases escaping through flues 18.

Part 2 is a siphon made of any refractory material, 3 is a conduit or passage way from the receptacle 1 to the drawing basin 4. The heat insulation of this conduit is preferably so balanced that the capacity of the inner surface of any part of this conduit to dissipate heat is proportional to the heat units in the glass cooling therethrough when the glass is moving with a uniform velocity throughout its transverse section in a direction at right angles thereto and may be accomplished in many ways. For instance by having a section similar to that shown in Fig. 5 where the envelop is everywhere the same but the volume of the stream passing therethrough varies to suit the capacities of the envelop to dissipate heat, or the stream may have a uniform section as shown in Fig. 6 and the insulating capacity of the envelop at the edges may be modified to give the required cooling action.

Part 5 is an annealing chamber with slow cooling walls having any drawing apparatus as, for instance, rolls 6, 6, as shown in my application and adapted to draw the glass from the basin 4 and pass it through the annealing chamber.

Port holes 7, 7, are closed with stoppers 8, 8, which allow the introduction of tongs to manipulate the siphon 2.

Two tap holes 9, 9, which allow the glass in channel 3 to be drawn off have two gas jets 10, 10, arranged to play in their openings to melt out the cold glass and heat the chamber 3 and basin 4 preliminary to starting the apparatus.

In the form of apparatus shown in Figs. 3 and 4, the neck or opening 11 to the chamber 12 is closed by a floating dam 13 having two inclined projections 14 and 15 adapted to engage the opposing faces on the neck 11 in such a way that when the float 13 is moved in the direction of the arrow an opening (the area of which depends upon the distance the block is moved) is maintained between the two which allows the glass to flow from the chamber 1 into the throat 11 thence through 12 to the slot or drawing basin 17.

In the form of apparatus shown in Figs. 1 and 2 several siphons of various capacities may be allowed to float in the glass so as to be always full of glass and ready for use and by picking out the desired size similar results as to regulating the movement of the glass from the chamber 1 into the channel 3 may be obtained as with the floating dam 13.

The operation of the apparatus is substantially as follows. The channel 3 having been properly heated by the gas jets 10 and the tap holes 9 suitably closed to prevent the glass from flowing therefrom, a siphon 2 of the proper capacity is picked up and placed in the position shown in the drawing when it begins to siphon the glass out of the chamber 1 into the channel 3 which filling up forces the glass up into the basin 4. Here a previously heated bait welds onto the glass and is drawn up by the rolls 6, 6, defining a sheet of glass of indefinite length as will hereinafter appear. The glass now flows in a stream from the receptacle 1 through the siphon 2, chamber 3 to the basin 4, the height of the glass in the basin 4 depending primarily upon two conditions; first, the temperature of the glass in the receptacle 1 (which determines its viscosity) and second, upon the speed at which it is being taken away at the formative point at 4, which acting in conjunction with condition 1 determines the head $x$ or the force that causes the glass to flow from the receptacle 1 to the basin 4.

A careful study of the drawings will disclose the following facts. The hotter the glass in the receptacle 1 the less will be the resistance to its movement of the siphon 2, chamber 3, and basin 4. The heat dissipating capacity of the chamber 3 being fixed the hotter the glass in receptacle 1 and the greater the velocity of the glass through chamber 3 the hotter it will be when it reaches the neck $4^a$. The higher the glass in the basin 4 the slower will be its movement through chamber 3 and consequent cooling there as also the greater will be the volume of glass in, and cooling capacity of, the basin 4 and the radiating surfaces of the glass $a$, $a$. The general effect of these variables upon each other is best understood by first assuming that the glass in receptacle 1 is at a certain temperature and that the various conditions are constant so that the drawing operation is progressing successfully when the temperature of the glass passing through the siphon 2 rises, the glass becoming more fluid the resistance of the siphon 2, chamber 3 and basin 4 decreases and the glass rises in the basin 4 which reduces the head $x$ and checks the flow of the glass.

The radiating surfaces $a$, $a$ of the glass in, as also the heat dissipating capacity of, the basin 4 and the time of cooling in the chamber 3 all increase so that the temperature of the glass at the formative point in 4 remains practically the same and the resulting product is not materially changed. On the other hand should the temperature of the glass passing through the siphon 2 fall the viscosity of the glass becoming greater it would flow more slowly and as the glass is being taken away at the same speed at the formative point in 4 the height of the glass would fall in the basin 4 thus decreasing the radiating surfaces $a$, $a$ and cooling capacity of the basin 4 which would so reduce the total cooling action of the chamber 3 and basin 4 that the temperature of the glass leaving the formative point would be again practically the same as before and the resulting product commercially available. In order to keep the glass in such a state of fluidity that it will move readily through the chamber 3, I prefer to have the heat dissipating capacity of the basin 4 large in proportion to the channel 3 and I preferably provide a neck as at $4^a$ where the glass passes through between two relatively cool walls which tend to cool the stream passing to the center of the sheet. This neck serves also to shut off any radiation from coming up from the hotter glass below. Glass being while still hot enough to be plastic diathermanous to radiant heat the cooling action in the basin 4 is radically different from what it would be with almost any other substance and as the colder the glass becomes the more diathermanous it becomes the heat from the inner stream is not only conducted but radiated through the colder enveloping glass with comparatively great freedom and is absorbed by the enveloping walls thereby helping to keep the cooler envelop warm and prevent too great a difference of temperature in the inner and outer streams of glass.

In Fig. 2 the cooling action upon the sheet of glass being drawn from and above the receptacle 4 is due to its natural radiation. The area of the sheet being practically constant for all thicknesses the cooling effect will vary with the time it is exposed to this radiating action so that the faster the sheet is developed the shorter the time this cooling action takes place. The stretching tension however increases rapidly as the speed increases so that assuming a constant supply of glass at a constant temperature at the formative point in 4 the faster the sheet is developed and taken away the thinner the sheet will become, the less heat will it contain and the less will be its time of cooling so that these two variables serve to largely correct each other and broadly speaking as the speed of drawing increases the volume of glass taken away tends to remain constant as also the temperature of the glass in the various zones of the developed sheet. However if the temperature of the glass at 4 falls the volume of glass taken away increases thus lowering the surfaces $a$, $a$ and increasing the head $x$, decreasing the cooling action of the chamber 3 and basin 4 and causing the glass to flow more rapidly from the receptacle 1 all of which tends to restore the temperature of the glass at the formative point in the basin 4.

As before stated where the glass leaves the orifice or basin 4 it passes through a cooling zone the action of which is due to the natural radiation of the glass and where it is desirable to modify this cooling action as for instance at the edges I use shields or reflectors as 19 which equalize the cooling from the various portions so that they all cool alike and whose action varies in the same manner as the other elements. These shields may be made in many ways but I prefer to use reflectors which do not absorb the heat but reflect it back again to its point of origin.

It will be readily understood by those skilled in the art that like results can be obtained by other arrangements so I do not confine myself as to the broad claims to the arrangement shown or described in the drawings.

I claim as my invention:

1. An apparatus for the manufacture of glass articles having in combination a receptacle for molten glass, a basin located outside of said chamber, a cooling channel connecting said receptacle and basin and having its walls constructed to permit of a dissipation of heat proportional to the volume of glass cooling therethrough at any given point, means for controlling the movement of glass through such channel or conduit and a glass-shaping mechanism arranged in operative relation to the basin.

2. An apparatus for the manufacture of glass articles having in combination a receptacle for molten glass, a basin located outside of the receptacle, a channel or conduit connecting the receptacle or basin for the progressive cooling of the glass to a working condition, means for applying heat to the inner surfaces of the said receptacle and basin, means for regulating the movement of glass through the conduit or channel and a glass shaping mechanism arranged in operative relation to the basin.

3. An apparatus for the manufacture of glass articles having in combination a receptacle for molten glass, a basin located outside of said receptacle, a channel or conduit connecting the receptacle and basin for the progressive cooling of the glass to a working condition in its flow to the basin, a drainage port or opening adapted to permit the drainage of the basin and conduit and means for controlling the movement of glass through the conduit or channel.

4. An apparatus for the manufacture of glass articles having in combination a receptacle for molten glass, a basin located outside of the receptacle, a channel or conduit connecting the receptacle and basin and means for controlling the heat dissipation from said channel or conduit whereby such dissipation will be proportional to the volume of glass cooling therethrough.

5. In an apparatus for the manufacture of glass articles, the combination of a receptacle for molten glass, a basin connected to the receptacle, a glass shaping mechanism and means for effecting the progressive and proportional cooling of the glass from the receptacle to the finished article.

6. In an apparatus for the manufacture of glass articles having in combination a receptacle for molten glass, a drawing basin and conduit or channel connected to the basin and a siphon arranged to draw the glass from the receptacle and deliver it to the conduit, said parts being so arranged that the rate of flow of glass to the drawing basin is automatically varied in accordance with the rate of movement of the glass from the drawing basin.

7. In an apparatus for the manufacture of glass articles having in combination a receptacle for molten glass, a V-shape basin located outside of the receptacle and having a variable heat dissipating capacity dependent on the depth of glass therein, a channel or conduit connecting the lower end of said chamber with the receptacle and means for drawing glass from the basin.

8. As an improvement in the art of manufacturing glass articles the method herein described which consists in feeding the glass to a formative point, subjecting the glass at such point to a shaping tension subjecting the glass during its feed and shaping operation to a progressive cooling action and regulating such cooling action so that the cooling will be approximately equal throughout its entire width.

9. As an improvement in the art of manufacturing glass articles the method herein described which consists in causing a flow of glass through a channel or conduit progressively cooling such stream of glass and regulating the cooling action by varying the rate of flow of glass.

10. As an improvement in the art of manufacturing glass articles the method herein described which consists in causing a flow of glass through a channel or conduit, drawing the glass away from the channel or conduit progressively cooling such stream of glass and regulating the amount of glass removed by varying the temperature of the glass.

11. As an improvement in the art of manufacturing glass articles the method herein described which consists in causing a flow of glass through a channel or conduit progressively cooling such stream of glass, regulating the cooling action by varying the rate of flow of glass, drawing the glass away from the channel or conduit and regulating the amount of glass removed by varying the temperature of the glass.

12. As an improvement in the art of manufacturing glass articles the method herein described which consists in causing a flow of glass through a cooling channel or conduit drawing the glass away from the channel, varying the temperature of the glass by the rate of movement thereof and varying the rate of movement in accordance with variations of temperature.

13. As an improvement in the art of manufacturing glass articles the method herein described which consists in causing a flow of glass through a cooling channel or conduit drawing the glass away from the channel, automatically varying the temperature of the glass by the rate of movement thereof and automatically varying the rate of movement in accordance with variations of temperature.

14. In an apparatus for the manufacture of glass articles the combination of a receptacle for molten glass a basin outside of the receptacle, a channel or conduit connecting the basin and receptacle, the basin and conduit being constructed to permit of a free dissipation of heat, the basin having a proportionately greater heat dissipating capacity than the conduit.

HALBERT K. HITCHCOCK

Witnesses:
A. DEQUINZE,
W E. BARNES